US010681411B2

(12) United States Patent
Baryla et al.

(10) Patent No.: US 10,681,411 B2
(45) Date of Patent: *Jun. 9, 2020

(54) INDIVIDUALIZED DYNAMIC INSERTION OF SECONDARY CONTENT IN LIVE STREAMING

(71) Applicant: International Business Machines Corporation, Armonk, NY (US)

(72) Inventors: Michael F. Baryla, Cary, NC (US); Aaron K. Baughman, Silver Spring, MD (US); Mauro Marzorati, Lutz, FL (US); Ahmed M. Nassar, Katy, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/013,907

(22) Filed: Jun. 20, 2018

(65) Prior Publication Data
US 2018/0302671 A1 Oct. 18, 2018

Related U.S. Application Data

(63) Continuation of application No. 15/401,775, filed on Jan. 9, 2017, now Pat. No. 10,034,046.

(51) Int. Cl.
H04N 21/45 (2011.01)
H04N 21/44 (2011.01)
H04N 21/442 (2011.01)
H04N 21/2187 (2011.01)
H04N 21/466 (2011.01)
H04N 21/422 (2011.01)

(52) U.S. Cl.
CPC ... *H04N 21/44016* (2013.01); *H04N 21/2187* (2013.01); *H04N 21/42201* (2013.01); *H04N 21/44218* (2013.01); *H04N 21/4532* (2013.01); *H04N 21/4667* (2013.01)

(58) Field of Classification Search
None
See application file for complete search history.

(56) References Cited

U.S. PATENT DOCUMENTS 10,034,046 B1 * 7/2018 Baryla ............... H04N 21/4532

OTHER PUBLICATIONS

List of IBM Patents or Applications Treated as Related, 2018.

* cited by examiner

*Primary Examiner* — Pankaj Kumar
*Assistant Examiner* — Charles N Hicks
(74) *Attorney, Agent, or Firm* — Garg Law Firm, PLLC; Rakesh Garg; James Nock

(57) ABSTRACT

During a live stream of a main content to a user, a biometric response of the user is measured during a first streamed portion of the main content. The biometric response is analyzed to detect an event in the first streamed portion of the main content. The biometric response of the user during the event indicates that the event is a user-specific climactic event. Based on the analysis, a user-specific set of feature values is computed that are representative of the user-specific climactic event in the first streamed portion of the main content. A user-specific non-climactic period is forecasted in a future portion of the live stream during which a likelihood of an occurrence of any user-specific climactic event is below a threshold likelihood. A secondary content is inserted during the user-specific non-climactic period.

20 Claims, 10 Drawing Sheets

INDIVIDUALIZED DYNAMIC INSERTION OF SECONDARY CONTENT IN LIVE STREAMING

TECHNICAL FIELD

The present invention relates generally to a method, system, and computer program product for insertion of other content in the live streaming of a main content. More particularly, the present invention relates to a method, system, and computer program product for individualized dynamic insertion of secondary content in live streaming.

BACKGROUND

Sporting events, newsworthy events, and other live phenomena are often transmitted live to users, who receive the live streams using a variety of devices. For example, a basketball game may be broadcast live to users watching the game on television sets, mobile phones, tablet computers, or other types of devices.

Hereinafter, a "live" stream of events refers to the transmission of data as near in time to the actual time of the occurrence of the events as is technologically possible or permissible by the transmitting entity. For example, live broadcasts of award shows or games are often slightly delayed intentionally to be able to capture and prevent the transmission of undesirable happenings in those shows or games. Such artificially introduced delays and delays caused by the processing of the signals do not distract from such transmissions being regarded as live within the scope of the illustrative embodiments.

Hereinafter, "main" content refers to the content or data that is primarily sought to be transmitted live, e.g. the content produced from the live events such as sporting events, ceremonies, etc. "Secondary" content refers to content other than the main content and which is obtained from a source other than the source of the main content. For example, advertising content provided by advertising content providers, which interrupts or overlays the main content provided by a provider covering a live event, can be regarded as example secondary content.

Presently, the placement of the secondary content within a transmission is statically pre-defined. For example, 2-minute commercial breaks—when the main content is interrupted and the secondary content is transmitted—may be planned at 9 minutes, 16 minutes, and 24 minutes in a 30-minute transmission of the main content. Regardless of the main content, the commercial breaks occur at those preset times (9, 16, and 24 minutes) for preset intervals (2 minutes).

The illustrative embodiments recognize that the static method of inserting the secondary content into the transmission of the main content can be disruptive to the main content. For example, at 9 minutes, the main content may be at or approaching a climactic event when the static insertion of the secondary content interrupts the main content.

The illustrative embodiments recognize that the users are often displeased by such poorly timed interruptions. The illustrative embodiments recognize that dynamically determining a suitable time for inserting secondary content into a main content transmission will be useful.

An event in the main content is regarded as climactic when the event satisfies a set of features which render the event of a significantly greater interest to a user as compared to another event in the main content. For example, while a football game as a whole may be exciting, an event where a user's favorite team scores a touchdown is significantly more exciting—of significantly greater interest—to the user as compared to, say, when the team moves the ball a few yards. One would say that touchdown events are climactic in a live broadcast of a football game. A user is deemed to have a significantly greater degree of aversion towards interrupting a main content transmission for secondary content insertion when a climactic event is likely, than otherwise.

A non-climactic period is a period during which a climactic event has a greater than a threshold probability of not occurring. A user is deemed to have a significantly greater degree of acceptance towards interrupting a main content transmission for secondary content insertion during a non-climactic period, than otherwise.

The illustrative embodiments further recognize that different users can relate to, associate with, or otherwise respond to different climactic events. For example, in a live telecast of a game between a team from New York and a team from Dallas, a user who is a fan of the team from New York is likely to regard as climactic those events where the New York team scores, whereas a user who is a fan of the team from Dallas is likely to regard as climactic those events where the Dallas team scores. Similarly, one user may regard comic events as climactic and another user may regard suspenseful events as climactic. For a variety of reasons, different users can and do have different events that they regard as climactic.

The illustrative embodiments recognize that not only is dynamically determining the insertion points for secondary content useful, the dynamic insertion can be tailored to individual user's preferences for climactic events. The secondary content can then be inserted in a non-climactic period of the main content transmission such that the non-climactic period is specific to the user's preferences.

The illustrative embodiments further recognize that improving the forecasting of climactic events and non-climactic periods is beneficial. The illustrative embodiments recognize that obtaining validation of a forecast from an actual user who is receiving the actual transmission is a good way to improve the forecasts.

The illustrative embodiments recognize that a user has to be incentivized to participate in providing feedback or other validation of a forecasted non-climactic period. As described herein, a live transmission is often artificially delayed for a variety of reasons. The illustrative embodiments recognize that altering the delay in the live streaming to a particular user in relation to the user's participation in the forecast validation, as a reward for such participation, is therefore useful.

A forecast validation is a manner of seeking user feedback about the forecast. A forecast validation can take the form of a question presented to the user, to which the user can respond using appropriate technology. A pre-insertion validation is a query configured to ask substantially whether the user agrees that the forecasted non-climactic period is unlikely to include a climactic event. The pre-insertion validation is presented before the secondary content in inserted into the transmission.

A post-insertion validation is a query configured to ask substantially whether the user observing the transmission actually did not miss any climactic events while the inserted secondary content was transmitted during the forecasted non-climactic period. The post-insertion validation is presented after the transmission of the inserted secondary content has completed.

An active user is a user who responds to a pre-insertion validation, post-insertion validation, or both. An active users group is a group comprised of active users. A passive user is a user who has not responded to any verification questions in at least a determined past period. A non-human device, such as a recording device, can be a passive user.

An activity-based ranking of an active user within the active users group is a standing or rank of the user relative to other users in the active users group, and is determined by a computation that user a number of validation responses provided by the user, how quickly the user responded to a validation question (a speed at which the user responded), or some combination of these and other similarly purposed factors.

A base delay in a live transmission is a fixed delay or lag configured in the transmission by the main content provider. A dynamic delay is an additional delay that can be configured by an embodiment. An event portrayed in the live transmission is therefore delayed by base delay plus dynamic delay. The dynamic delay can be user-specific, i.e., different for different users.

SUMMARY

The illustrative embodiments provide a method, system, and computer program product. An embodiment includes a method that measures, during a live stream of a main content to a user, a biometric response of the user during a first streamed portion of the main content. The embodiment analyzes the biometric response, to detect an event in the first streamed portion of the main content, wherein the biometric response of the user during the event indicates that the event is a user-specific climactic event. The embodiment computes, based on the analyzing, a user-specific set of feature values that are representative of the user-specific climactic event in the first streamed portion of the main content. The embodiment forecasts, using a processor and a memory, a user-specific non-climactic period in a future portion of the live stream during which a likelihood of an occurrence of any user-specific climactic event is below a threshold likelihood. The embodiment inserts, during the user-specific non-climactic period, a secondary content in the future portion of the live stream that is directed only to the user, such that a likelihood of the secondary content insertion interrupting the live stream of the main content during a second user-specific climactic event is less than a second threshold of likelihood.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
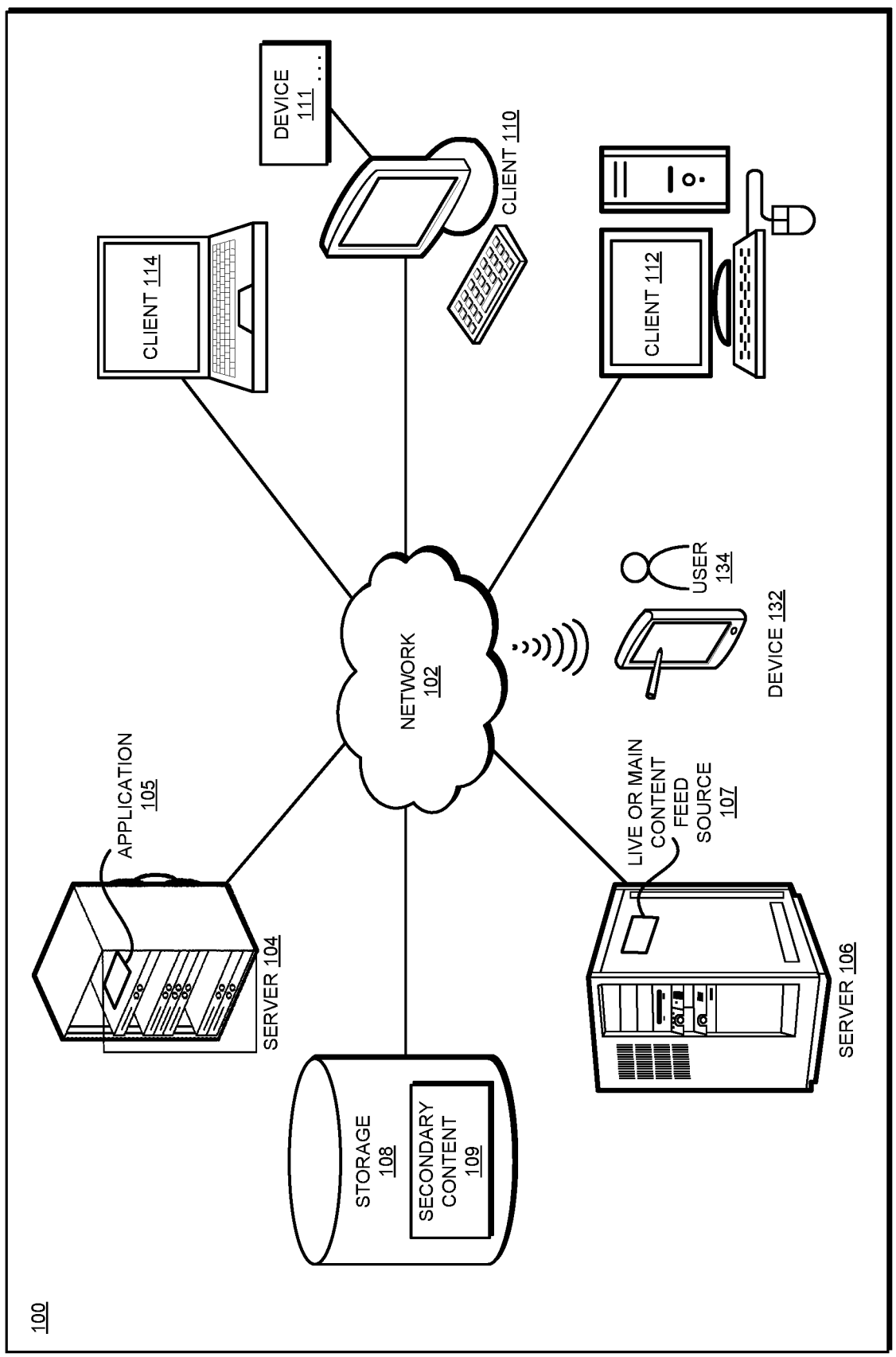
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to individualized dynamic insertion of secondary content in live streaming.

An embodiment can be implemented as a software application. The application implementing an embodiment can be configured as a modification of an existing live main content transmission system, as a separate application that operates in conjunction with an existing live main content transmission system, a standalone application, or some combination thereof.

Particularly, some illustrative embodiments provide a method by which it can be determined whether a climactic event is likely to occur during a future period in the main content transmission, and insert secondary content during a non-climactic period.

For example, an embodiment employs a known forecasting algorithm in a known forecasting engine to forecast an optimal dynamically determined time window during which a secondary content of length L can be inserted. For example, if a live telecast of a sporting tournament is ongoing, the embodiment determines that within the next S seconds of the ongoing telecast, the secondary content of length L seconds will be inserted in the ongoing telecast of the live sporting tournament. An optimization criterion selected for determining the time window is configured to choose the period over a defined forecasting time distance where the least probability exists for a climactic event in the sporting tournament.

Generally, one embodiment formulates a set of factor values from a set of generally accepted climactic events, where the set of factor values is representative of a climactic event in the set of generally accepted climactic events. A generally accepted climactic event is an event that an ordinary user is likely to find climatic. Some examples of generally accepted climactic events include but are not limited to scoring events in sports, victory or loss declaration in contests or matches, proclamations or announcements by persons or entities of interest, declarations, summarizations, revelations, conclusions, plot twists or storyline changes, and the like.

A factor associated with an event can have a value that is indicative of the event being a climactic event or a non-climactic event. For example, a factor may be a noise level or a rate of change thereof in a scene and the level or the rate exceeding an upper threshold level may be indicative of a climactic event and vice-versa. As another example, a factor may be the noise level or a rate of change thereof in a scene and the level or the rate falling below a lower threshold level may be indicative of a climactic event and vice-versa. Some other non-limiting example factors may be the light intensity level or a rate of change thereof in a scene, the presence or absence of visible or audible artifacts in the main content.

These examples of factors and values indicative of climactic events are not intended to be limiting. From this disclosure, those of ordinary skill in the art will be able to conceive many other factors and their values, and the same are contemplated within the scope of the illustrative embodiments.

Using the set of factor values, the embodiment uses the forecasting engine to predict whether an event that satisfies the set of factor values is likely to occur during a period, and a probability of such an occurrence. When an event that satisfies the set of factor values is predicted within the forecasting period with greater than a threshold likelihood, the embodiment concludes that a climactic event has been identified in the forecasting period.

Some other illustrative embodiments provide a method which determines the likes and dislikes of a particular user in the given main content and computes an adjusted set of features that define climactic events for that user. The method then determines when the non-climactic period would occur in the main content transmission for that particular user and causes the secondary content to be inserted in that user-specific non-climactic period.

For example, during the transmission of a main content, an embodiment uses one or more sensors to measure a particular user's response to the content. For example, a biometric sensor may measure a shifting of the body weight implying disinterest (less than a threshold amount of shifting implying keen interest) in the content being presented. As another example, facial expression analysis can measure interest or disinterest and levels thereof. A camera can observe a shift in the gaze of the user to make similar measurements. Many other biometric and other types of sensors can similarly be employed to measure the user's interests and disinterests in a given main content.

From such measurements, an embodiment identifies one or more climactic events and non-climactic events, and the differences between one or more of their factor values. From the identified climactic events, the embodiment extracts a set of factor values that are indicative of a climactic event. In one embodiment, a generic set of factor values is deemed to be indicative of generally accepted climactic events is modified with the factor values that are representative of the events that the particular user finds climactic.

Some more illustrative embodiments provide a method by which a user's level of participation, or activity, in responding to pre-insertion validation questions, post-insertion validation question, or both is determined relative to other participating users (active users). The method then adjusts a dynamic component of the artificially introduced delay in the live stream to the user where the dynamic delay has an inverse relationship with the activity-based ranking the user achieves in the active users group. The more the user participates in the validation process, the faster the user responds to validation questions, or both, the higher the user ranks in the active users group and the smaller the dynamic delay becomes for that user.

For example, upon identification of a non-climactic period of L seconds, with a sufficiently high confidence that there will not be a critical event within the next S+L seconds from a current time in the main content transmission, an embodiment presents a question to verify the forecasted non-climactic period. For example, a set of users are presented with audible and/or visible cues during the main content transmission, and the users are given a time window with which to provide an affirmative or negative answer to the question. For example, the question may be "a second content of 120 seconds will be presented in 30 seconds. Agree Y/N?" With at least a threshold number of affirmative answers from active users, the embodiment schedules the insertion of the second content within the main content sometime within the S seconds from the current time.

Users who provided an answer are regarded as active users. Active users are given a boost in their standing or activity-based ranking within the active users. The boost in the activity-based ranking of an active user is based on the speed with which the user provides the answer, a number of times the user has provided answers to verification questions, or some combination of these and other similarly purposed considerations.

One embodiment further employs an aging mechanism to age out those users from the active users group who were previously active but are not active anymore. For example, in an aging operation of the embodiment, all users of the active users group are reduced in their standing by a static amount for each unit of time since their last answer. This decay mechanism ages-out active users who have disengaged and reverted back to being passive users.

The verification questions, answers, and the resulting activity-based ranking can occur before the secondary content is inserted, after the secondary content is completely transmitted, or both. For example, upon ending the second content, an embodiment presents an audible or visual cue to all users, who can respond affirmatively or negatively as to the effectiveness of the timing of the insertion (i.e., whether no climactic event was missed as a result of the insertion). Users who respond are promoted to the active users group if not already in the group. Their ranking is adjusted as described herein. An embodiment uses the ranking of an active user to compute a total delay (base delay+dynamic delay) to time shift the transmission of the main content for the particular user.

An embodiment collects the verification responses from participating users. The embodiment uses the responses in a machine learning process to improve the forecasting capabilities of the forecasting engine. For example, one embodiment uses the responses to the pre-insertion validation to adjust the forecasting of the non-climactic period such that a confidence in the forecast and the number of affirmative validation responses from active users are increased in subsequent forecasting.

As another example, another embodiment uses the post-insertion validation responses to increase an accuracy of a future forecast. Another example embodiment uses the pre-insertion validation and post-insertion validation responses to adjust the forecasting engine such that a forecasting period during which reliable forecast of non-climactic period can be made is increased for future forecasts.

The manner of individualized dynamic insertion of secondary content in live streaming described herein is unavailable in the presently available methods. A method of an embodiment described herein, when implemented to execute on a device or data processing system, comprises substantial advancement of the functionality of that device or data processing system in dynamically inserting secondary content in a live transmission of a main content without interfering with any climactic events that might occur in the live main content.

The illustrative embodiments are described with respect to certain types of contents, transmissions, delays, events, climactic events, non-climactic events, periods, forecasts, thresholds, validations, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
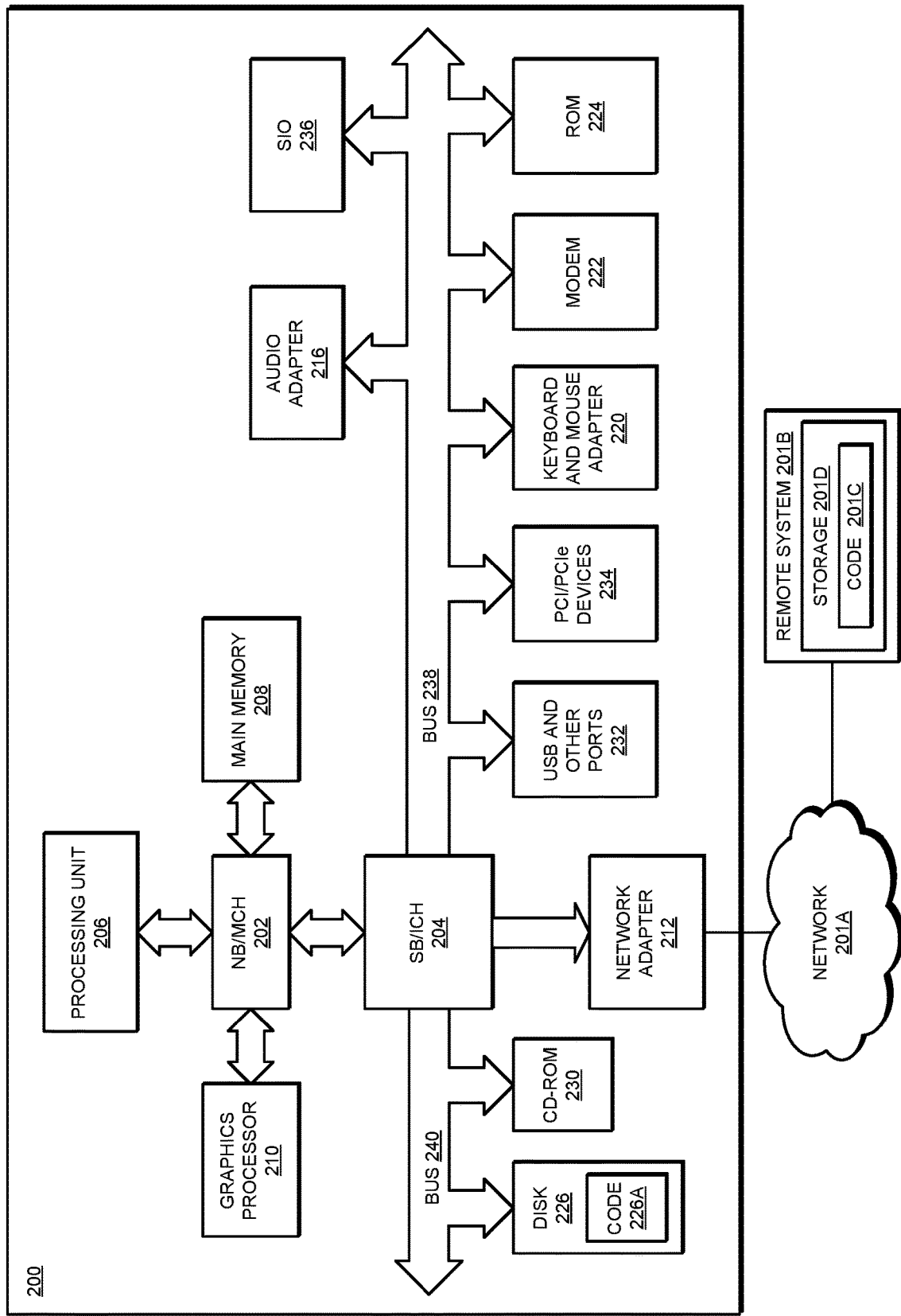
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Example source 107 provides the main content for a live stream or transmission. Secondary content 109 may be stored in storage 108 as shown or supplied by another source (not shown). As an example, user 134 may receive the live stream of the main content on device 132. User 134 may respond to validation questions using an interface (not shown) on device 132. Recording device 111 may be associated with client 110 as another method of receiving the live stream of the main content. The combination of client 110 and device 111 may be regarded as an example passive user.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
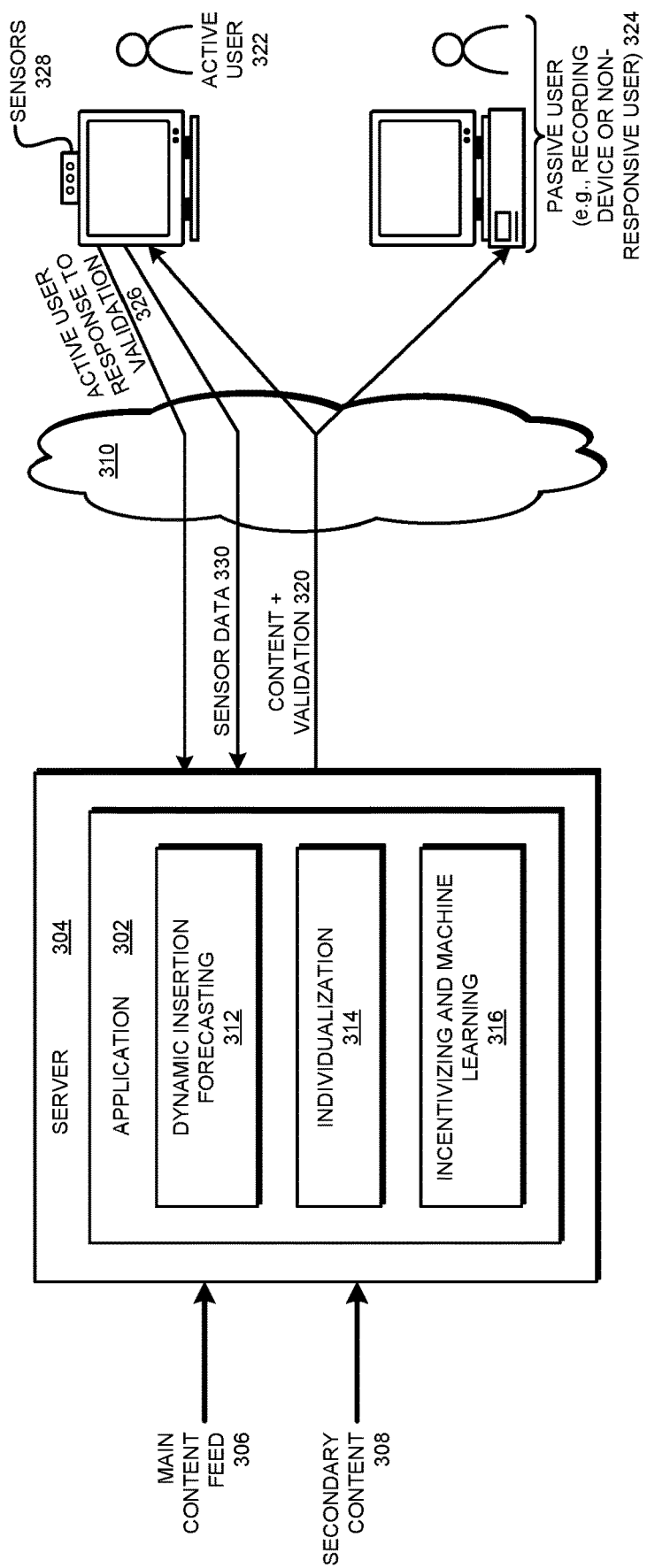
FIG. 3 depicts a block diagram of an example configuration for intelligent insertion of secondary content in live streaming in accordance with an illustrative embodiment.

With reference to FIG. 3, this figure depicts a block diagram of an example configuration for intelligent insertion of secondary content in live streaming in accordance with an illustrative embodiment. Application 302 is an example of application 105 in FIG. 1 and executes in server 304, which is an example of server 104 in FIG. 1.

A feed of main content 306 is obtained from source 107 in FIG. 1. Secondary content 308 is an example of secondary content 109 in FIG. 1. Network 310 is an example of network 102 in FIG. 1.

Application 302 includes component 312, which performs non-climactic period forecasting for dynamic insertion of secondary content 308 into the feed of main content 306, as described herein. Component 314 performs individualization of the non-climactic period by determining an individual user-specific climactic event and non-climactic period, as described herein. Component 316 creates and manages validation response incentives in the form of dynamic delay in the live content delivery to a user. Component 316 collects and uses the validation responses from one or more users, during one or more live transmissions, in a machine learning process to adjust or tune the forecasting engine used by component 312.

As an example, suppose that application 302 facilitates transmission 320 to users 322 and 324. Transmission 320 includes main content 304. At some point during the transmission, application 302 also includes in transmission 320 a forecasting validation, such as a pre-insertion validation for an upcoming insertion or a post-insertion validation of an insertion previously performed. Suppose that user 322 is an active user and user 324 is a passive user. Active user 322 provides response 326 to the validation. Component 316 uses response 326 to rank user 322 and adjust a dynamic delay in transmission 320 to user 322. For example, the total delay in transmission 320 to user 322 may be less than the total delay in transmission 320 to user 324.

One or more sensors 328 measure reactions of user 322 to the content in transmission 320. Sensor data 330 is used by component 314 to individualize the non-climactic period forecasting as described herein.

Figure 4:
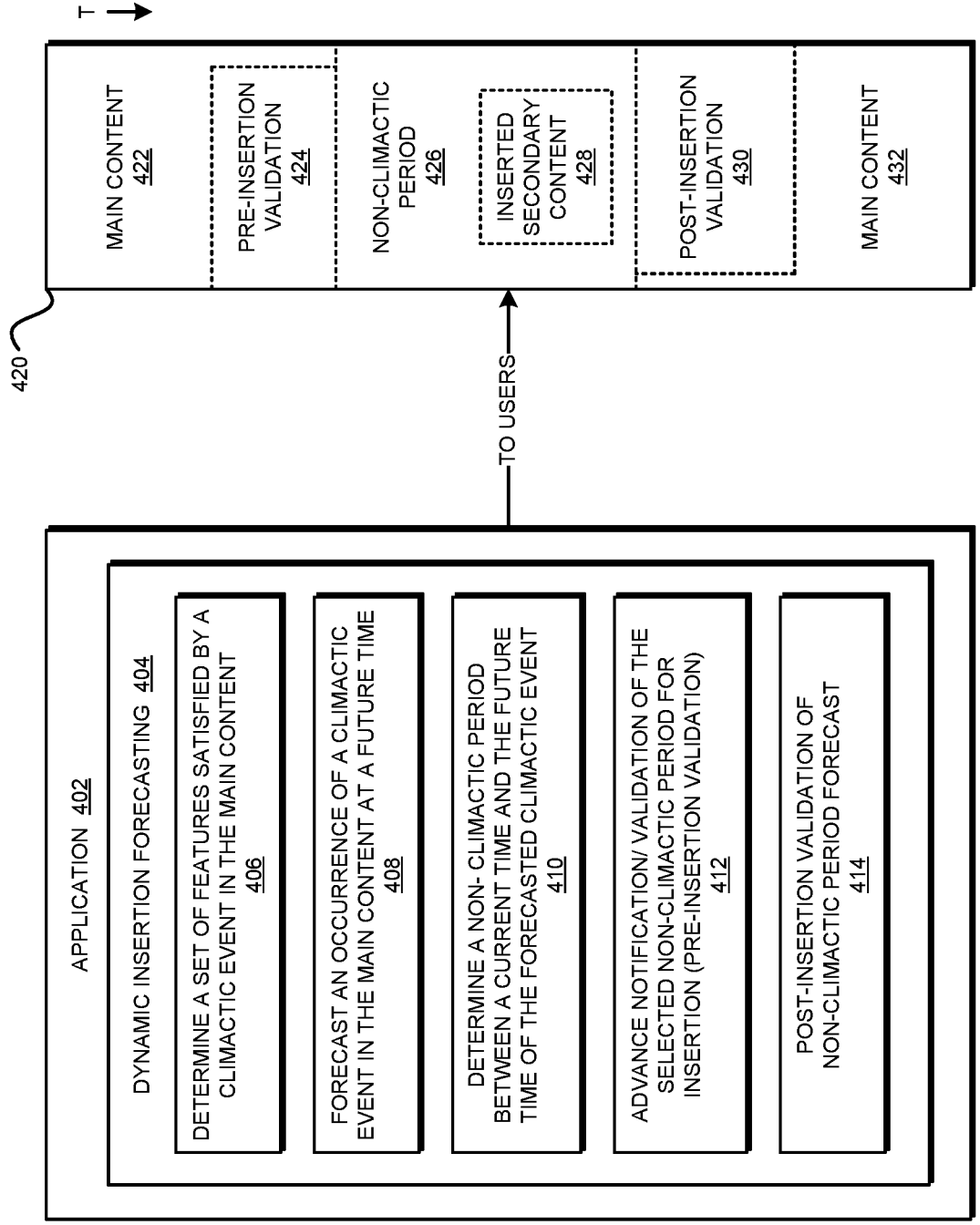
FIG. 4 depicts a block diagram of an example configuration for dynamic insertion forecasting in accordance with an illustrative embodiment.

With respect to FIG. 4, this figure depicts a block diagram of an example configuration for dynamic insertion forecasting in accordance with an illustrative embodiment. Application 402 is an example of application 302 in FIG. 3. Dynamic insertion forecasting component 404 is an example of component 312 in FIG. 3 and includes subcomponents as described herein.

Subcomponent 406 determines a set of features and the corresponding feature values that are satisfied by a climactic event in the main content. The main content may be main content 306 in FIG. 3. For example, subcomponent 406 analyzes an already streamed portion of the main content from a live streaming of a main content, to identify an occurrence of one or more climactic events in the main content. Subcomponent 406 then determines the conditions in the main content under which the climactic events occurred in the already streamed portion. Using the conditions, subcomponent 406 constructs the set of feature values.

Subcomponent 408 uses a forecasting engine to forecast an occurrence of a climactic event in the main content at a future time. Subcomponent 410 correspondingly determines or forecasts a non-climactic period between the current time and the future time of the climactic event. When no climactic event is expected, the future time of the climactic event can be the end of main content.

Subcomponent 412 provides a pre-insertion validation to the users of the main content feed. The pre-insertion validation may also serve as an advance notification to the users—active as well as passive—of an upcoming insertion of secondary content into the main content. Subcomponent 414 provides a post-insertion validation to the users of the main content feed.

In an example operation, a user might receive sequence 420 of data in the live stream (the progression of time is shown by the arrow labeled "T")—portion 422 of the main content is received followed by pre-insertion validation 424. In some implementations, pre-insertion validation 424 may be presented while portion 420 is being received. After pre-insertion validation 424, non-climactic period 426 begins during which secondary content 428 is received. Following the completion of secondary content 428, post-insertion validation 430 is received. After a response period of post-insertion validation 430 has elapsed, or simultaneously with post-insertion validation 430 depending on the implementation, portion 432 of main content may be received. Sequence 420 may repeat any number of times during a live streaming.

Figure 5:
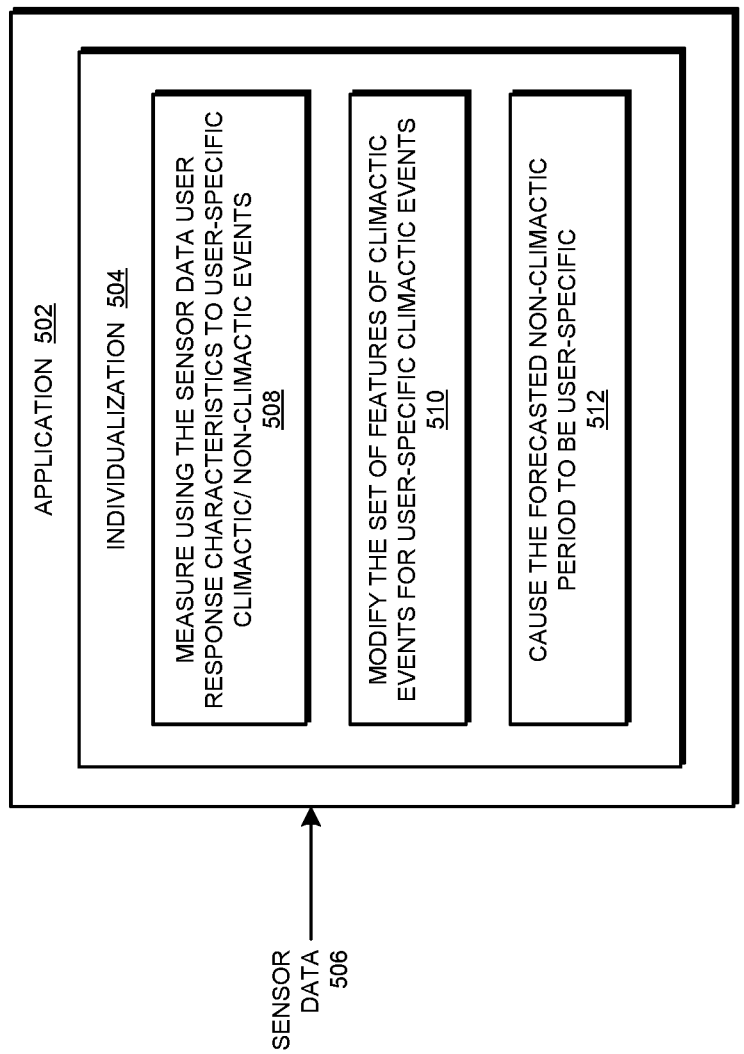
FIG. 5 depicts a block diagram of an example configuration for individualization of the dynamic insertion forecasting in accordance with an illustrative embodiment.

With reference to FIG. 5, this figure depicts a block diagram of an example configuration for individualization of the dynamic insertion forecasting in accordance with an illustrative embodiment. Application 502 is an example of application 302 in FIG. 3. Individualization component 504 is an example of component 314 in FIG. 3 and includes subcomponents as described herein. Sensor data 506 is an example of sensor data 330 in FIG. 3.

Subcomponent 508 uses sensor data 506 to measure a user reaction characteristics in response to events that the user regards as climactic or non-climactic. From these measurements, subcomponent 508 identifies the set of feature values that represent user-specific climactic events. If a generic set of feature values for generally accepted climactic events were produced and used, e.g., by subcomponent 406 in FIG. 4, subcomponent 510 modifies that set of feature values so that the modified set of feature values are indicative of user-specific climactic events. Subcomponent uses the modified set of feature values to cause the forecasting of the non-climactic period, e.g., by subcomponents 408 and 410 in FIG. 4, to be a forecasting of a user-specific non-climactic period.

Figure 6:
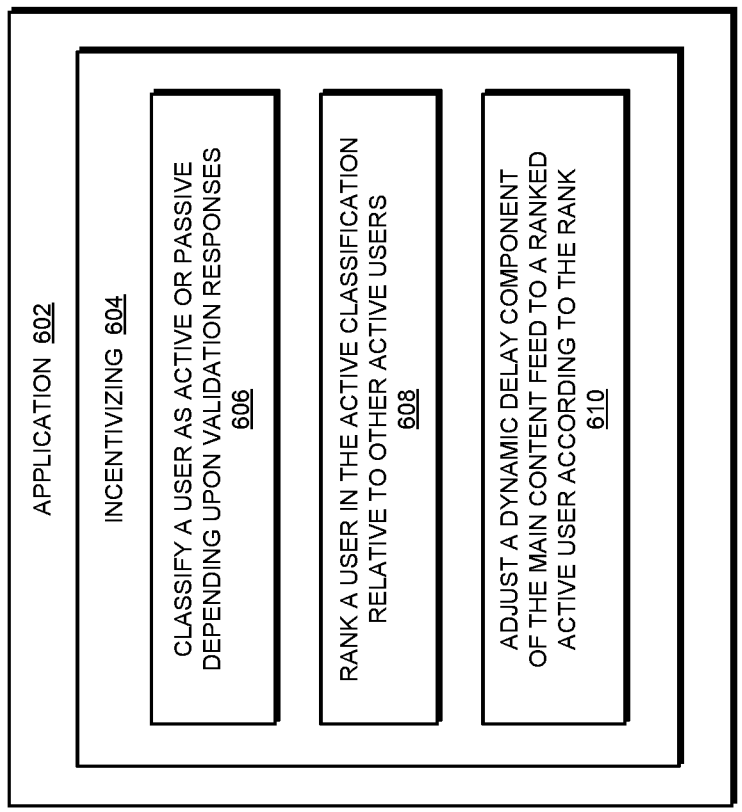
FIG. 6 depicts a block diagram of an example configuration for incentivizing a user to respond to forecast validation requests in accordance with an illustrative embodiment.

With reference to FIG. 6, this figure depicts a block diagram of an example configuration for incentivizing a user to respond to forecast validation requests in accordance with an illustrative embodiment. Application 602 is an example of application 302 in FIG. 3. Incentivizing component 604 is an example of some functionality of component 316 in FIG. 3 and includes subcomponents as described herein.

Subcomponent 606 classifies a user as active or passive depending upon the validation responses provided or not provided by the user. Subcomponent 608 ranks an active user relative to other active users in an active users group. Subcomponent 610 adjusts a dynamic delay in the main content feed to a ranked active user according to the user's rank.

Figure 7:
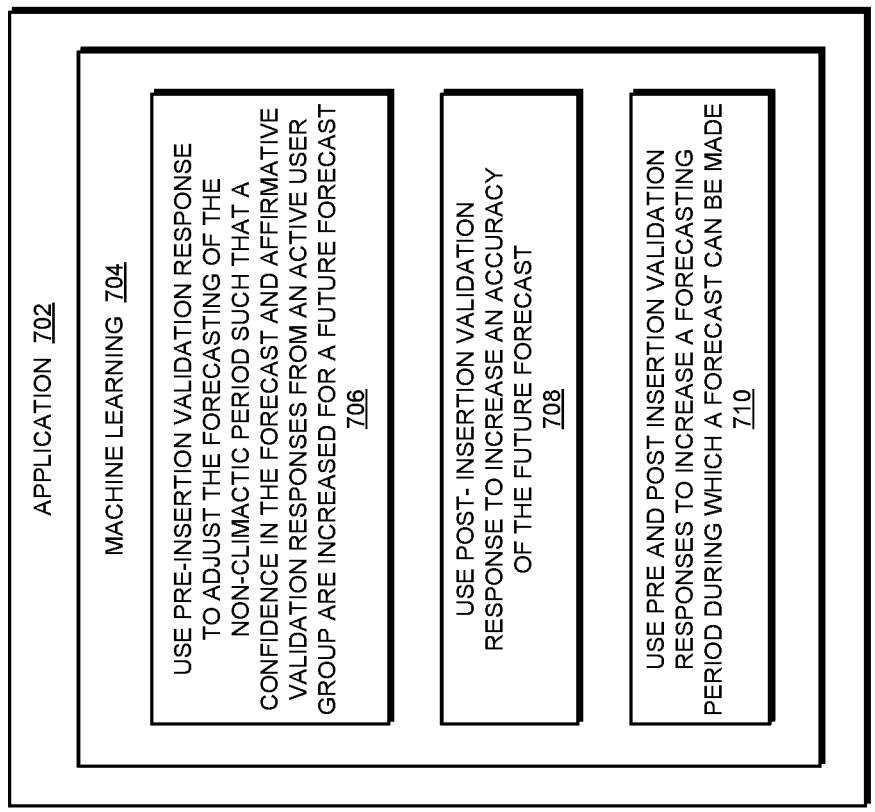
FIG. 7 depicts a block diagram of an example configuration for improving non-climactic period forecasting via machine learning in accordance with an illustrative embodiment.

With reference to FIG. 7, this figure depicts a block diagram of an example configuration for improving non-climactic period forecasting via machine learning in accordance with an illustrative embodiment. Application 702 is an example of application 302 in FIG. 3. Machine learning component 604 is an example of some functionality of component 316 in FIG. 3 and includes subcomponents as described herein.

Subcomponent 706 uses one or more pre-insertion validation responses to adjust the non-climactic period forecasting such that a confidence value of the future forecasts, affirmative validation responses for the future forecasts, or both, are increased. Subcomponent 708 uses one or more post-insertion validation responses to increase or improve an accuracy of subsequent forecasted non-climactic period. Subcomponent 710 uses pre-insertion validation and post-insertion validation responses to Increase a forecasting period over which a non-climactic period can be forecasted with a greater than a threshold degree of confidence.

Figure 8:
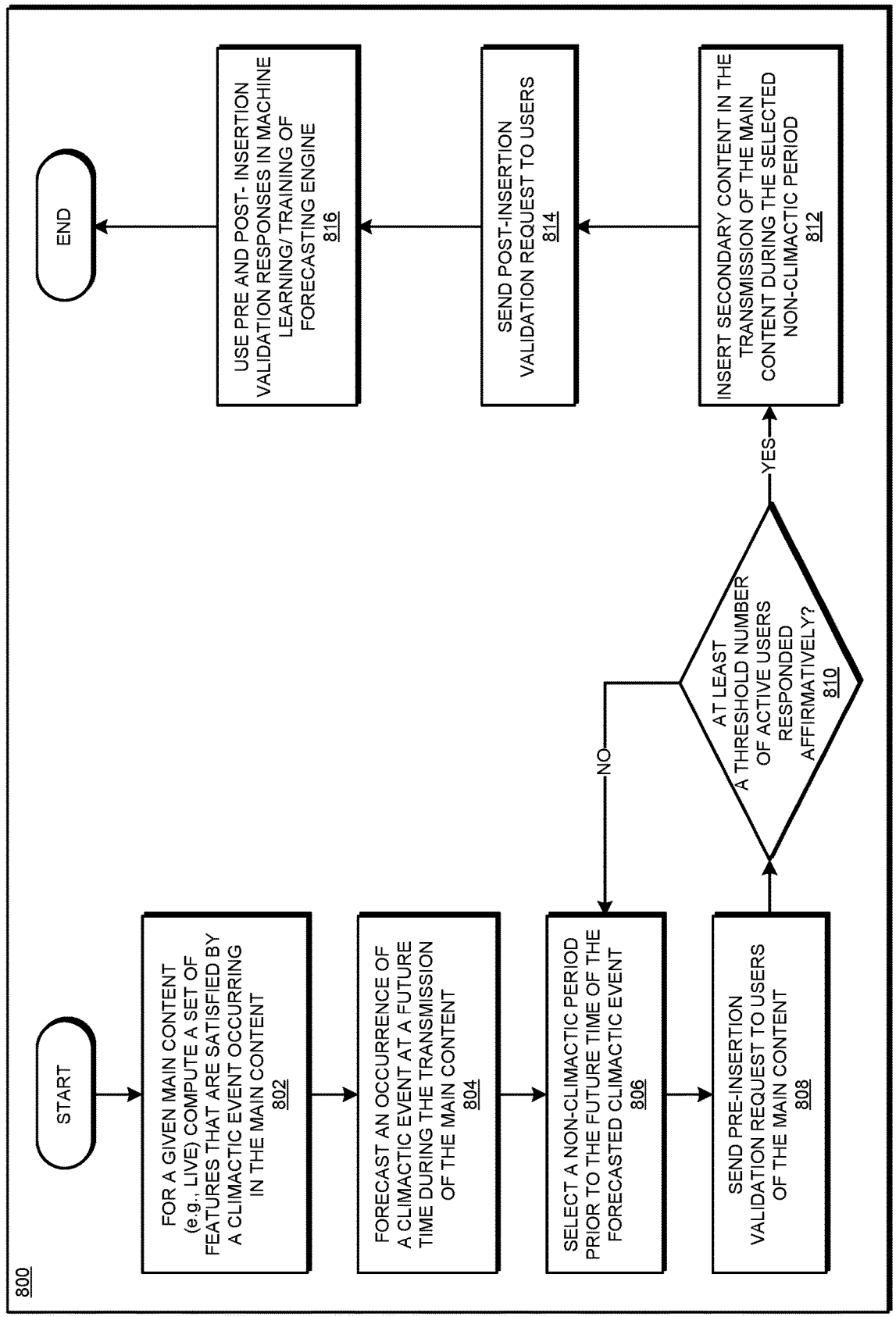
FIG. 8 depicts a flowchart of an example process for intelligent insertion of secondary content in live streaming in accordance with an illustrative embodiment.

With reference to FIG. 8, this figure depicts a flowchart of an example process for intelligent insertion of secondary content in live streaming in accordance with an illustrative embodiment. Process 800 can be implemented in application 302 in FIG. 3 or application 402 in FIG. 4.

For a given main content, the application computes a set of feature values that are used, presented, or otherwise satisfied in a climactic event occurring in the main content (block 802). Using the set of feature values, the application forecasts an occurrence of a climactic event at a future time during the live streaming of the main content (block 804). The application selects a non-climactic period prior to the future time of the forecasted climactic event (block 806). In an implementation, blocks 804 and 806 can be combined such that a non-climactic period is forecasted instead of forecasting a climactic event, without departing the scope of the illustrative embodiments.

The application sends a pre-insertion validation request to the users of the live stream (block 808). The application determines whether at least a threshold number of active users have responded affirmatively to the request, validating the forecasted non-climactic period (block 810). If the threshold number of active users have responded but the affirmatives are not up to the threshold number ("No" path of block 810), the application returns to block 806 to select a new non-climactic period. If the number of active users has not reached the threshold (a default condition), or if at least the threshold number of affirmative responses have been received ("Yes" path of block 810), the application insets the secondary content in the live streaming of the main content at the selected non-climactic period (block 812).

The application may optionally send a post-insertion validation request after the transmission of the secondary content has completed (block 814). The application collects the pre-insertion validation and post-insertion validation responses and uses the response in machine learning or training of the forecasting engine (block 816). The application ends process 800 thereafter.

Figure 9:
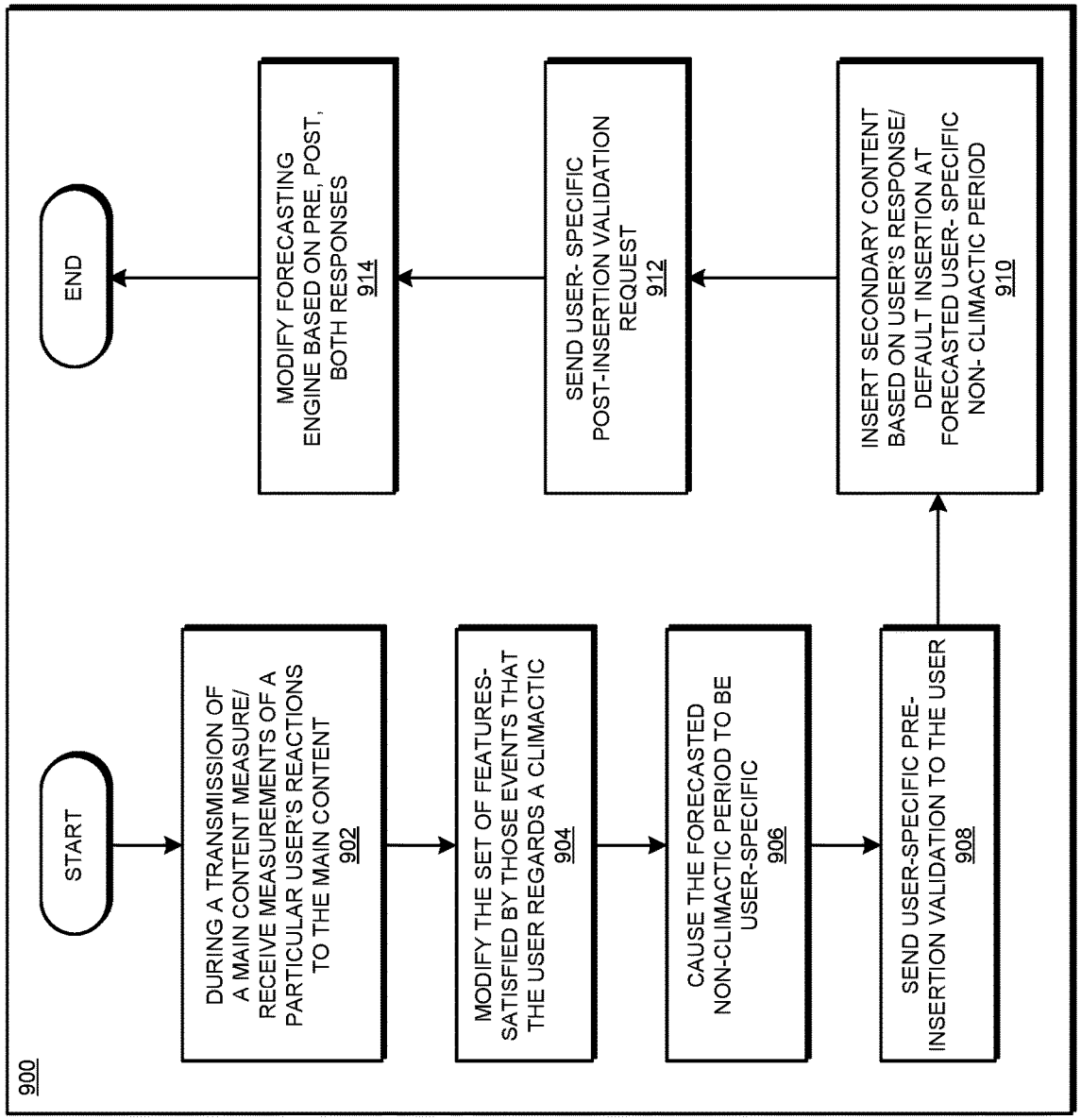
FIG. 9 depicts a flowchart of an example process for individualization of non-climactic period forecasting in accordance with an illustrative embodiment.

With reference to FIG. 9, this figure depicts a flowchart of an example process for individualization of non-climactic period forecasting in accordance with an illustrative embodiment. Process 900 can be implemented in application 302 in FIG. 3 or application 502 in FIG. 5.

During a live streaming of a main content, the application measures or receives a measurement of one or more reactions of a particular user, the reactions being in response to user's perception of the events unfolding in the live stream (block 902). The application creates a set of feature values, or modified a set of generic climactic event feature values if one has been created already, to represent those events that the particular user regards as climactic events (block 904). Using the modified set of feature values, the application causes the forecasting of the non-climactic period, e.g., in blocks 804 and 806 in FIG. 8, to be user-specific (block 906).

The application sends a user-specific pre-insertion validation request to the particular user (block 908). The application inserts the secondary content at the user-specific non-climactic period based on the particular user responding affirmatively or causing a default insertion during the user-specific non-climactic period in case of non-response (block 910). If the user repeatedly responds negatively, the application can be configured to select a limited number of alternate non-climactic periods before selecting one non-climactic period as a default.

Once the transmission of the inserted secondary content has completed, the application optionally may send a user-specific post-insertion validation request to the particular user (block 912). The application modifies the forecasting engine based on the user's responses to the pre-insertion validation, post-insertion validation, or both (block 914). The application ends process 900 thereafter.

Figure 10:
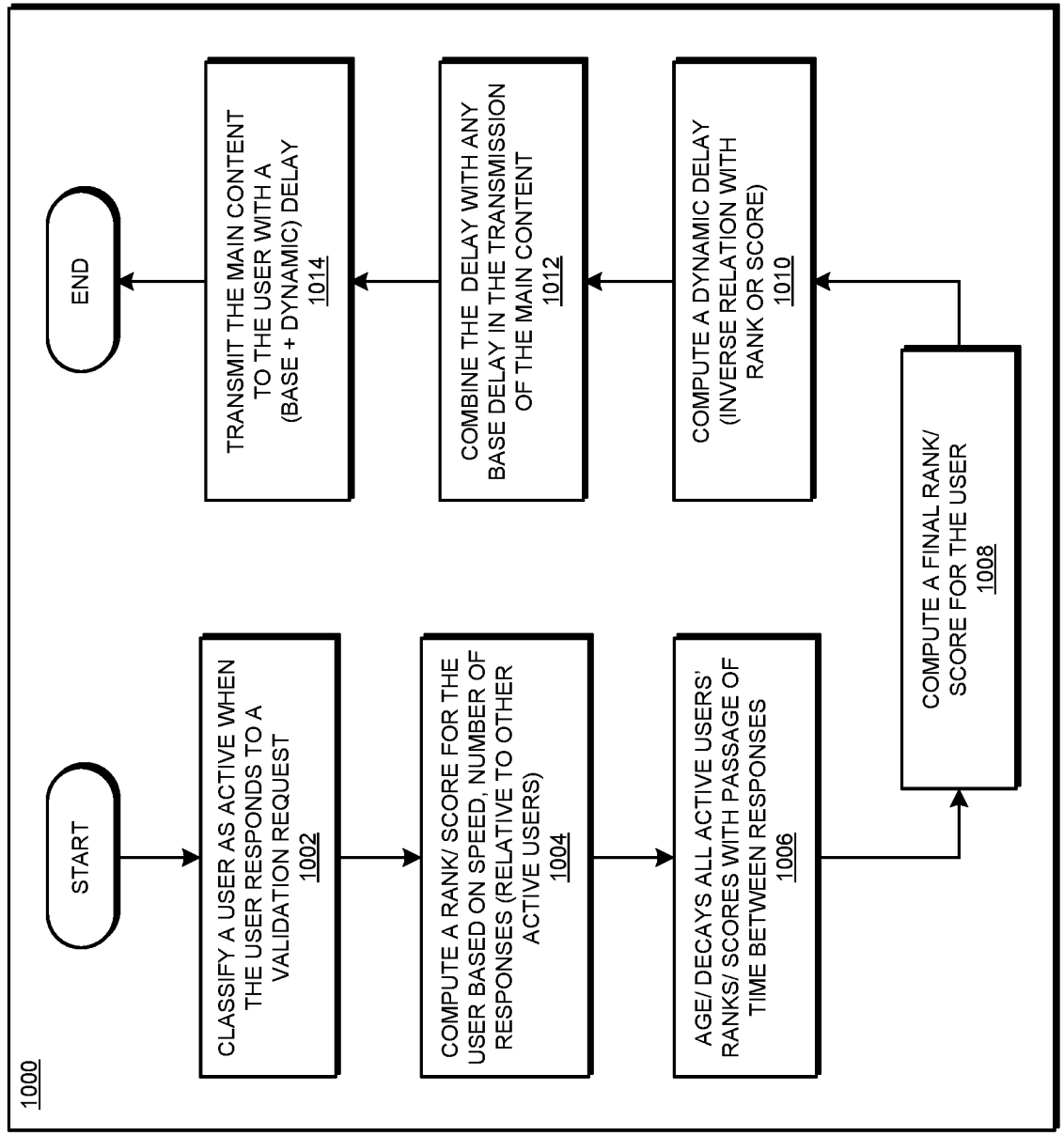
FIG. 10 depicts a flowchart of an example process for incentivizing users to respond to forecast validation requests in accordance with an illustrative embodiment.

With reference to FIG. 10, this figure depicts a flowchart of an example process for incentivizing users to respond to forecast validation requests in accordance with an illustrative embodiment. Process 1000 can be implemented in application 302 in FIG. 3 or FIG. 602 in FIG. 6.

The application classifies a user as active when the user responds to a validation request (block 1002). The application computes a rank or score for the user relative to other active users, based on the speed at which the user responds, number of responses the user has provided during a given period or feed, or some combination thereof (block 1004).

The application ages or decays all active users' ranks or scores with the passage of time between responses (block 1006). The application computes a final rank or score of the user (block 1008). The application computes a dynamic delay period which has an inverse relationship with the final rank or score of the user (block 1010).

The application combines the computed dynamic delay with a base delay used in the live stream (block 1012). The application transmits, or causes the transmission, of the main content with the total delay of base delay plus dynamic delay (block 1014). The application ends process 1000 thereafter.

Thus, a computer implemented method, system or apparatus, and computer program product are provided in the illustrative embodiments for individualized dynamic insertion of secondary content in live streaming and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
measuring, during a live stream of a main content to a user, a biometric response of the user during a first streamed portion of the main content;
analyzing the biometric response, to detect an event in the first streamed portion of the main content, wherein the biometric response of the user during the event indicates that the event is a user-specific climactic event;
computing, based on the analyzing, a user-specific set of feature values that are representative of the user-specific climactic event in the first streamed portion of the main content;
forecasting, using a processor and a memory, a user-specific non-climactic period in a future portion of the live stream during which a likelihood of an occurrence of any user-specific climactic event is below a threshold likelihood;
configuring a pre-insertion validation request to determine whether the user agrees that a second user-specific climactic event is unlikely to occur during the forecasted user-specific non-climactic period;
transmitting the pre-insertion validation request to only the user, in the live stream to the user, prior to inserting a secondary content in the live stream; and
inserting, during the user-specific non-climactic period, a secondary content in the future portion of the live stream that is directed only to the user.

2. The method of claim 1, further comprising:
continuing the live stream of the main content after the secondary content is completely transmitted in the live stream directed only to the user.

3. The method of claim 1, further comprising:
analyzing an already streamed portion of the main content, from the live stream of the main content to a second user, to identify an occurrence of a generic climactic event in the main content; and
constructing, based on the analysis the already streamed portion, a generic set of feature values that are representative of the generic climactic event, wherein the computing the user-specific set of feature values modifies as feature value in the generic set of feature values to form the user-specific set of feature values.

4. The method of claim 1, wherein a likelihood of the secondary content insertion interrupting the live stream of the main content during the second user-specific climactic event is less than a second threshold of likelihood.

5. The method of claim 1, wherein the pre-insertion validation request is transmitted simultaneously with the main content that is being transmitted to the user in the live stream.

6. The method of claim 1, further comprising:
configuring a pre-insertion validation request to determine whether the user agrees that the second user-specific climactic event is unlikely to occur during the forecasted user-specific non-climactic period;
transmitting the pre-insertion validation request to only the user, in the live stream to the user, prior to inserting the secondary content in the live stream;
receiving a user input, wherein the user input is a negative response to the pre-insertion validation request;
forecasting, responsive to the negative response, a second user-specific non-climactic period, and wherein the inserting the secondary content during the user-specific non-climactic period inserts the secondary content during the second user-specific non-climactic period.

7. The method of claim 1, further comprising:
configuring a pre-insertion validation request to determine whether the user agrees that the second user-specific climactic event is unlikely to occur during the forecasted user-specific non-climactic period;
transmitting the pre-insertion validation request to only the user, in the live stream to the user, prior to inserting the secondary content in the live stream;
failing to receive a user input, wherein the inserting the secondary content during the user-specific non-climactic period is responsive to the failing.

8. The method of claim 1, further comprising:
configuring a post-insertion validation request to determine whether the user agrees that the inserted secondary content actually did not interrupt any user-specific climactic event in the main content;
transmitting the post-insertion validation request to only the user, in the live stream to the user, after completing a transmission of the inserted secondary content in the live stream;
receiving a user input, wherein the user input is an affirmative response to the post-insertion validation request; and
using the affirmative response to the post-insertion validation request to increase a forecasting period during which a future user-specific non-climactic period will be forecasted.

9. The method of claim 1, further comprising:
forecasting, as a part of forecasting the user-specific non-climactic period, an occurrence of a next user-specific climactic event in the main content at a future time, the forecasting of the next user-specific climactic event using the user-specific set of feature values; and regarding a period from a current time to the future time as the user-specific non-climactic period.

10. The method of claim 1, wherein the main content is captured from a live event occurring in real-time.

11. A computer usable program product comprising one or more computer-readable storage devices, and program instructions stored on at least one of the one or more storage devices, the stored program instructions comprising:
program instructions to measure, during a live stream of a main content to a user, a biometric response of the user during a first streamed portion of the main content;
program instructions to analyze the biometric response, to detect an event in the first streamed portion of the main content, wherein the biometric response of the user during the event indicates that the event is a user-specific climactic event;
program instructions to compute, based on the analyzing, a user-specific set of feature values that are representative of the user-specific climactic event in the first streamed portion of the main content;
program instructions to forecast, using a processor and a memory, a user-specific non-climactic period in a future portion of the live stream during which a likelihood of an occurrence of any user-specific climactic event is below a threshold likelihood; and
program instructions to configure a pre-insertion validation request to determine whether the user agrees that a second user-specific climactic event is unlikely to occur during the forecasted user-specific non-climactic period;
program instructions to transmit the pre-insertion validation request to only the user, in the live stream to the user, prior to inserting a secondary content in the live stream; and
program instructions to insert, during the user-specific non-climactic period, a secondary content in the future portion of the live stream that is directed only to the user.

12. The computer usable program product of claim 11, further comprising:
program instructions to continue the live stream of the main content after the secondary content is completely transmitted in the live stream directed only to the user.

13. The computer usable program product of claim 11, further comprising:
program instructions to analyze an already streamed portion of the main content, from the live stream of the main content to a second user, to identify an occurrence of a generic climactic event in the main content; and
program instructions to construct, based on the analysis the already streamed portion, a generic set of feature values that are representative of the generic climactic event, wherein the computing the user-specific set of feature values modifies as feature value in the generic set of feature values to form the user-specific set of feature values.

14. The computer usable program product of claim 11, wherein a likelihood of the secondary content insertion interrupting the live stream of the main content during the second user-specific climactic event is less than a second threshold of likelihood.

15. The computer usable program product of claim 11, wherein the pre-insertion validation request is transmitted simultaneously with the main content that is being transmitted to the user in the live stream.

16. The computer usable program product of claim 11, further comprising:
program instructions to configure a pre-insertion validation request to determine whether the user agrees that the second user-specific climactic event is unlikely to occur during the forecasted user-specific non-climactic period;
program instructions to transmit the pre-insertion validation request to only the user, in the live stream to the user, prior to inserting the secondary content in the live stream;
program instructions to receive a user input, wherein the user input is a negative response to the pre-insertion validation request;
program instructions to forecast, responsive to the negative response, a second user-specific non-climactic period, and wherein the inserting the secondary content during the user-specific non-climactic period inserts the secondary content during the second user-specific non-climactic period.

17. The computer usable program product of claim 11, further comprising:
program instructions to configure a pre-insertion validation request to determine whether the user agrees that the second user-specific climactic event is unlikely to occur during the forecasted user-specific non-climactic period;
program instructions to transmit the pre-insertion validation request to only the user, in the live stream to the user, prior to inserting the secondary content in the live stream;
program instructions to fail to receive a user input, wherein the inserting the secondary content during the user-specific non-climactic period is responsive to the failing.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to measure, during a live stream of a main content to a user, a biometric response of the user during a first streamed portion of the main content;
program instructions to analyze the biometric response, to detect an event in the first streamed portion of the main content, wherein the biometric response of the user during the event indicates that the event is a user-specific climactic event;
program instructions to compute, based on the analyzing, a user-specific set of feature values that are representative of the user-specific climactic event in the first streamed portion of the main content;

program instructions to forecast, using a processor and a memory, a user-specific non-climactic period in a future portion of the live stream during which a likelihood of an occurrence of any user-specific climactic event is below a threshold likelihood; and program instructions to configure a pre-insertion validation request to determine whether the user agrees that a second user-specific climactic event is unlikely to occur during the forecasted user-specific non-climactic period;

program instructions to transmit the pre-insertion validation request to only the user, in the live stream to the user, prior to inserting a secondary content in the live stream; and program instructions to insert, during the user-specific non-climactic period, a secondary content in the future portion of the live stream that is directed only to the user.

* * * * *